United States Patent [19]
Carpenter

[11] Patent Number: 5,881,951
[45] Date of Patent: Mar. 16, 1999

[54] VENTILATOR FOR BENEATH ENCLOSED STRUCTURES

[76] Inventor: Peter W. Carpenter, 19 Lexington Dr., Conway, Ark. 72032

[21] Appl. No.: 932,898

[22] Filed: Sep. 18, 1997

[51] Int. Cl.⁶ .................................. B01F 3/02; F24F 7/00
[52] U.S. Cl. ........................ 236/44 A; 165/251; 454/258
[58] Field of Search .......................... 165/251; 236/44 A, 236/44 R, 49.3; 454/239, 256, 258

[56] References Cited

U.S. PATENT DOCUMENTS

| | | | |
|---|---|---|---|
| 3,332,620 | 7/1967 | Streed | 236/44 A |
| 4,210,278 | 7/1980 | Obler | 165/251 |
| 4,964,566 | 10/1990 | Pugh . | |
| 5,253,804 | 10/1993 | Sarazen, Jr. et al. . | |
| 5,294,049 | 3/1994 | Trunkle . | |
| 5,722,587 | 3/1998 | Jung | 236/44 A |

FOREIGN PATENT DOCUMENTS

404130905 A  5/1992  Japan .................... 236/44 A

*Primary Examiner*—William Wayner
*Attorney, Agent, or Firm*—Joe D. Calhoun

[57] ABSTRACT

An apparatus for ventilating the crawl space of a structure, comprising an exhaust fan in a housing adapted to at least partially occlude an aperture in a foundation wall of a structure and oriented to, upon receiving an appropriate stumulus, exhaust crawl space air through said aperture to outside the structure, a temperature sensor and a relative humidity sensor for sensing the respective temperatures and relative humidities of crawl space air and of outside air, and for transmitting respective stimulus dependent thereon to a programmed computer, said computer also adjusting said relative humidity stimulii for temperature-dependent deviation, then determines the absolute moisture differential from said adjusted stimulii and compares said differential to a pre-set minimum absolute moisture differential parameter for ventilation activation, said computer also functionally connected to said fan for controlling the activation thereof

26 Claims, 11 Drawing Sheets

ARRANGEMENT WITH SINGLE SET OF TEMPERATURE & HUMIDITY SENSORS

ARRANGEMENT WITH SINGLE SET OF TEMPERATURE & HUMIDITY SENSORS

ARRANGEMENT WITH DUAL SET OF TEMPERATURE & HUMIDITY SENSORS

CHART DEPICTING DECLINING CRAWL SPACE RELATIVE HUMIDITY WHILE OUTSIDE MOISTURE IS RISING

VENTILATOR FOR BENEATH ENCLOSED STRUCTURES

BACKGROUND OF THE INVENTION

The present invention generally relates to ventilation systems for dead air spaces beneath structures, including (for example) cellars, basements and crawl spaces under houses or commercial structures. Such ventilation systems are typically designed to reduce or prevent foundation and subfloor wood rot, reduce build-up of molds, spores and the like, reduce the incidence of wet insulation, and reduce infestation by pests. Many structures are built with underlying dead air space which, for the sake of convenience, will be called crawl space for the purpose of this application. Although crawl space may be entirely enclosed and physically separated from the outside environment, often the structure foundation has vents or other portals directly or indirectly open to the outside atmosphere. In any event, due to the moisture content of soil and air, crawl spaces are often damp or humid, and accordingly susceptible to the problems mentioned above. Moisture tends to cause mold, mildew, rot and general corrosion of the structure foundation walls and subflooring; moisture also increases the likelihood of infestation by pests.

To avoid such problems, builders often install air vents in the foundation walls, intended to reduce interior moisture by replacing moist crawl space air with dryer outside air. There are a number of preexisting ventilators having a variety of features, such as opening and closing of vents or louvers to facilitate passive ventilation or the activation of fans for active ventilation, dependent upon temperature or crawl space humidity. Many patents relating to such ventilators are listed in U.S. Pat. No. 5,294,049 (the "'049 patent") and U.S. Pat. No. 5,253,804 (the "'804 patent").

The '049 issued to Trunkle, et al. claims a fan-powered foundation ventilator system having a louver housing that is selectively opened or closed depending upon the temperature of the crawl space air enclosed by the floors and the foundation walls of the building structure. The '804 patent issued to Sarazen, et al. claims a foundation ventilator apparatus including activated louvers or an electrical fan controlled by detected temperature or humidity; according to the disclosure in that patent, the opening and the closing of the louvers is independent of the electric fan operation. That patent essentially discloses a ventilator system having both active ventilation (fan dependent upon crawl space humidity) and passive ventilation (temperature-dependent louver opening) components.

One disadvantage of those inventions is that there is no mechanism for preventing ventilation by outside air that will actually be counterproductive by increasing the crawl space moisture. Such counterproductive conditions include time when outside air contains more absolute moisture than the crawl space air. Since the cited patents do not appreciate the differences between the absolute moisture content and the relative humidity of both outside and inside air, it is likely that such fan-powered ventilation may cause the exchange of outside air containing more moisture than its inside counterpart, leading to an increase in moisture within the crawl space and perhaps even condensation therein. As an example, assume it is 80° F. outside with 50% relative humidity, whereas crawl space air is 65° F. with 60% relative humidity; by standard calculations, the absolute moisture of the outside air is 13.37 mm Hg, whereas the absolute moisture of crawl space air is 9.29 mm Hg. Under these circumstances, if outside air moves into the crawl space and cools from 80° F. to 65° F., such replacement of crawl space air will result in a 44% increase in absolute moisture; accordingly, the relative humidity of the crawl space air will increase to 86%, using standard calculations.

As another example, assume it is 95° F. outside with 45% relative humidity, whereas crawl space air is 65° F. with 60% relative humidity; by standard calculations, the absolute moisture of the outside air is 18.98 mm Hg, whereas the absolute moisture of crawl space air is 9.29 mm Hg. Under these circumstances, if outside air moves into the crawl space and cools from 95° F. to 65° F., such replacement of crawl space air will result in a 104% increase in absolute moisture, and the relative humidity of the crawl space air will increase to 100%. Under such circumstances, condensation of water vapor will occur in the crawl space. These examples illustrate that the ventilation systems known in the field may result in the exchange of moisture-laden outside air for crawl space air having relatively less moisture.

U.S. Pat. No. 4,964,566 issued to Pugh, et al. discloses a ventilator system responsive to both the humidity level within the crawl space and to outside temperature. According to the disclosure of that patent, when outside temperatures are above freezing, and when the crawl space humidity rises above a predetermined level, a humidistat sends a signal to a solenoid to open the vent and cause a fan to exhaust the crawl space air. Like the two previously cited patents, this invention may cause the exchange of moisture-laden outside air for crawl space air having a relatively lower moisture content.

One primary object of the invention disclosed herein is to provide a ventilator that will cause the exchange of air only when it will lower the moisture in the crawl space. It is another object to provide a ventilator designed to reduce or prevent foundation and subfloor wood rot, and reduce the buildup of mold, spores and wet insulation. Another object includes providing a ventilator to better protect home inspectors, contractors and home owners from bacteria, molds, termiticides and other substances found in crawl spaces due to humidity. It is another object to provide a ventilator that saves heating and cooling energy costs, helps prevent pipes from freezing, and ventilates undesirable gases and chemicals.

SUMMARY OF THE INVENTION

In general, this application pertains to an apparatus for ventilating the crawl space of a structure, comprising: an exhaust fan in a housing adapted to at least partially occlude an aperture in a foundation wall of a structure and oriented to, upon receiving an appropriate stumulus, exhaust crawl space air through said aperture to outside the structure; a humidity sensor for sensing the relative humidities of crawl space air and outside air, and for transmitting respective stimulus dependent upon the respective relative humidity (the "RH stimulus"); a temperature sensor for sensing the temperatures of crawl space air and outside air, and for transmitting respective stimulus dependent upon the respective temperature (the "temperature stimulus"); a programmed computer functionally connected separately to said humidity sensor and said temperature sensor, for controlling the activations thereof and receiving each respective RH stimulus and each respective temperature stimulus, said computer also programmed for adjusting said RH stimulus for known temperature-dependent deviations and using each such adjusted stimulus to determine the respective absolute moistures of the crawl space air and the outside air, said computer also programmed for determining the absolute moisture differential therebetween and comparing said differential to a pre-set minimum absolute moisture differential parameter for ventilation activation, said computer also functionally connected to said fan for controlling the activation thereof.

Note that the computer parts in the above figures are mere representations, not necessarily a depiction of actual appearance; also not shown are connections to necessary power sources.

Figure 1:
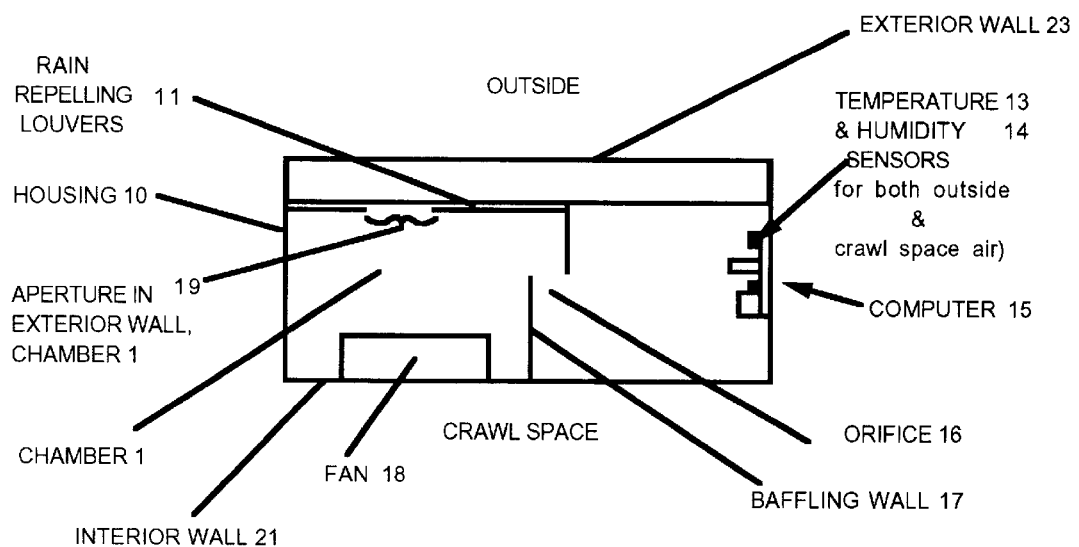
FIG. 1 depicts a schematic diagram of one general embodiment having a single set of temperature and humidity sensors.
Figure 5:
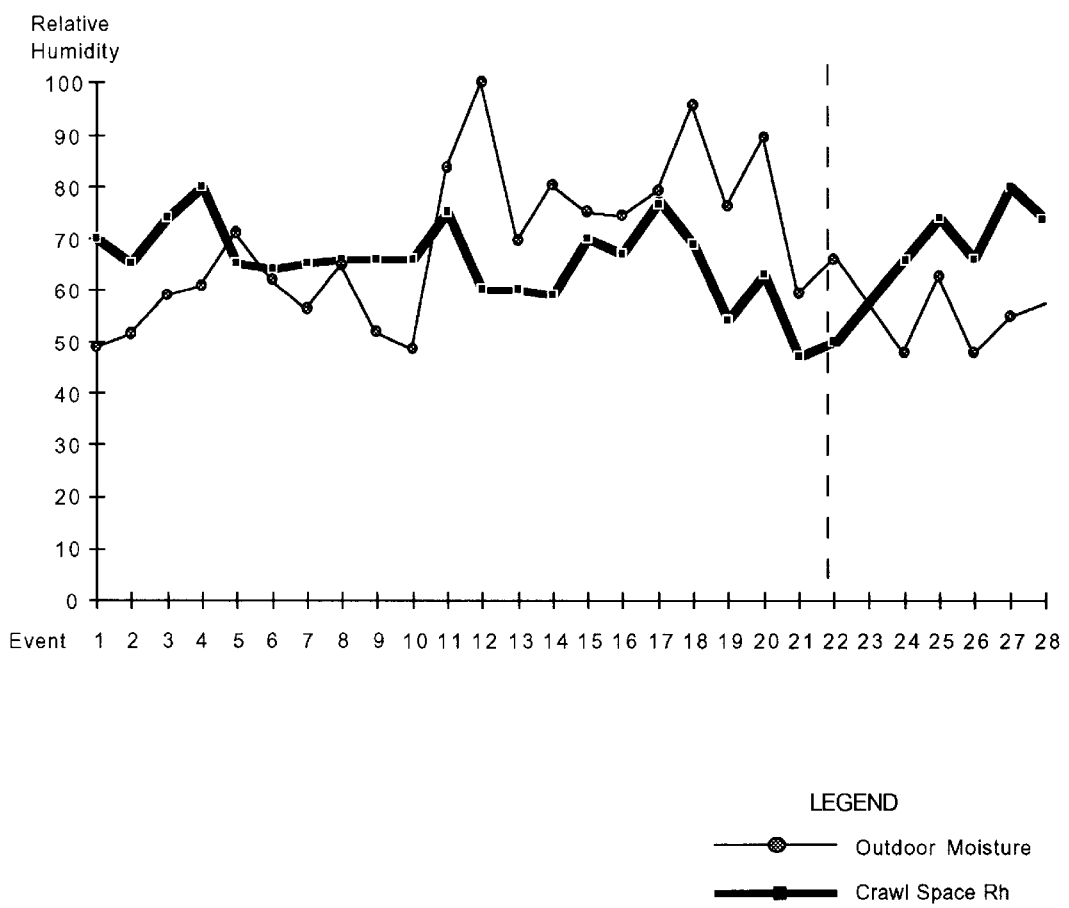

FIG. 5 depicts a line graph of data obtained using a crawl space ventilator comparable to that depicted in FIG. 1. The graph plots crawl space relative humidity over 22 readings during a time frame of approximately four months; the line for outside moisture during the same duration was merely superimposed on the relative humidity graph, to indicate the trends of the measurements for the two related parameters. (Although both lines depict the trends of each respective parameter, the vertical distances between each line do not necessarily depict the particular magnitude of difference, since each line measures a different parameter.) Readings 23 through 28 essentially constitute an informal control situation, wherein the ventilator was removed, and the crawl space vents were opened to allow natural passive ventilation during a period when wind and outside humidity conditions were favorable to such ventilation. As illustrated by the first 22 readings, the ventilator brought the crawl space humidity below that of the outside air, and (with a few exceptions) maintained it below the outside humidity level. (Peak outdoor moistures at events 12, 18 and 20 were days of heavy rain.) With the ventilator removed, the crawl space humidity essentially mirrored that of the outside air, and was consistently higher than outside air.

As depicted in FIG. 5, ventilator operation begins at event 1. Prior to the startup of the crawl space ventilator, all foundation brick vents were open. At event 1, all foundation brick vents except the crawl space ventilator were closed. Note the gradual lowering of crawl space relative humidity with relation to outdoor absolute moisture. This change is gradual because moisture is slowly being drawn from the structure. At event 22, a profound change in the weather presented the opportunity to test the effectiveness of the standard passive vents. Crawl space relative humidity had been lowered. At event 22 there were three days of extremely high winds of 25–35 mph, moderate temperatures, plus very low outdoor moisture (as evidenced by the chart data); at event 22, all foundation vents were opened, and the crawl space ventilator was removed. After event 22, with all passive foundation vents opened, a crawl space moisture reversal takes place; the crawl space humidity doubles in relation to the outside moisture, even though the outdoor conditions are most favorable for lowering humidity. This indicates that standard passive vents perform poorly. With the crawl space ventilator comparing absolute moisture levels of both outside air and crawl space air before ventilating, crawl space humidity is significantly lowered even though outside moisture levels are rising.

Figure 6:
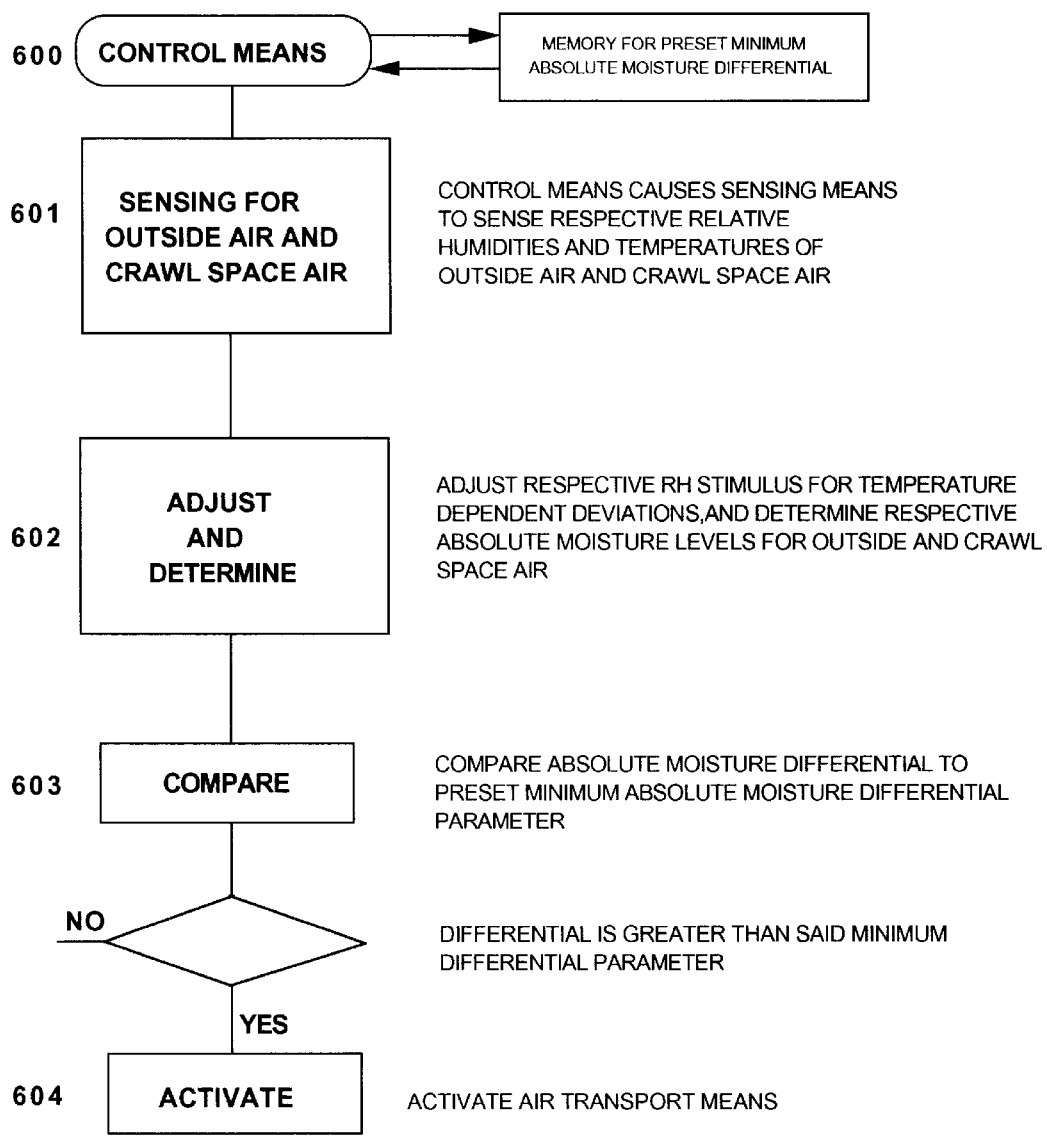

FIG. 6 depicts the operational steps of the invention forming the basis of claim 3.

Figure 7:
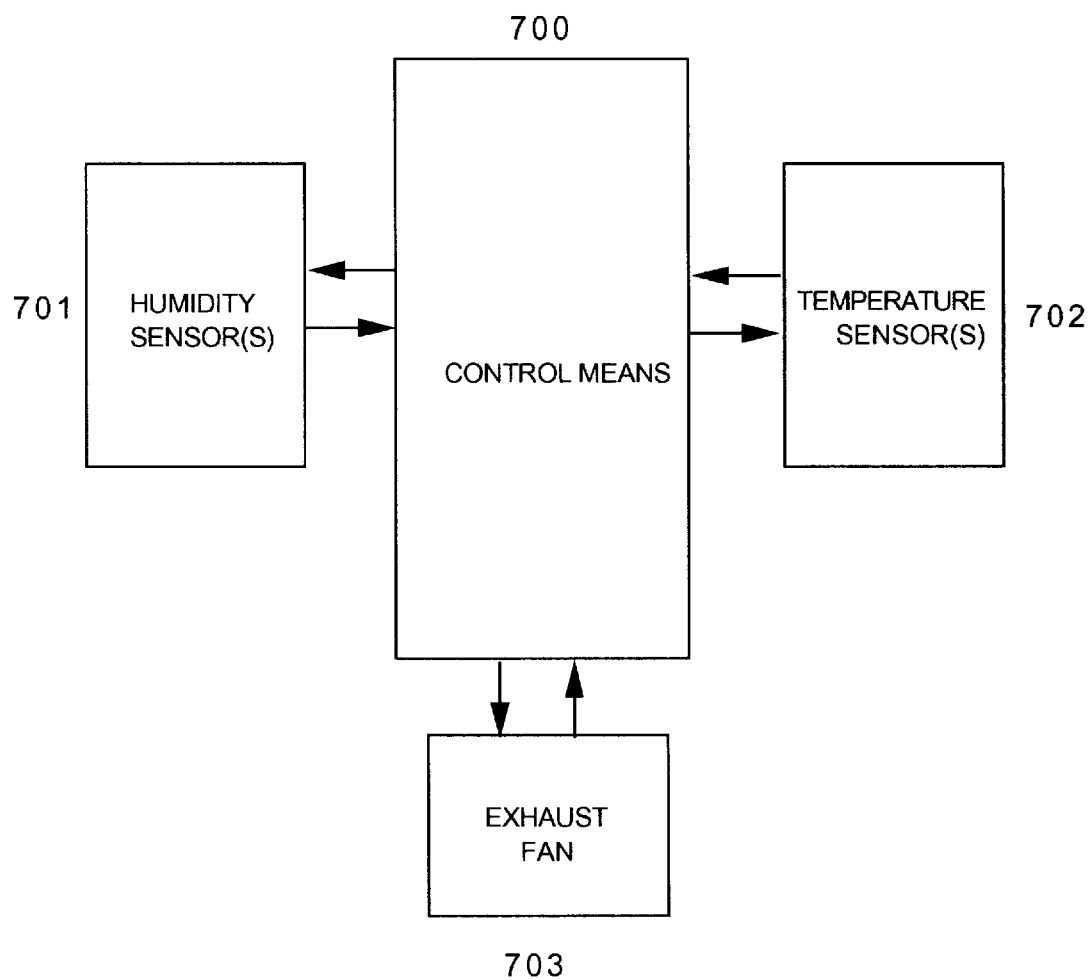

FIG. 7 depicts a schematic of the relationship of the basic components of the version of the invention forming the basis of claim 1.

Figure 8:
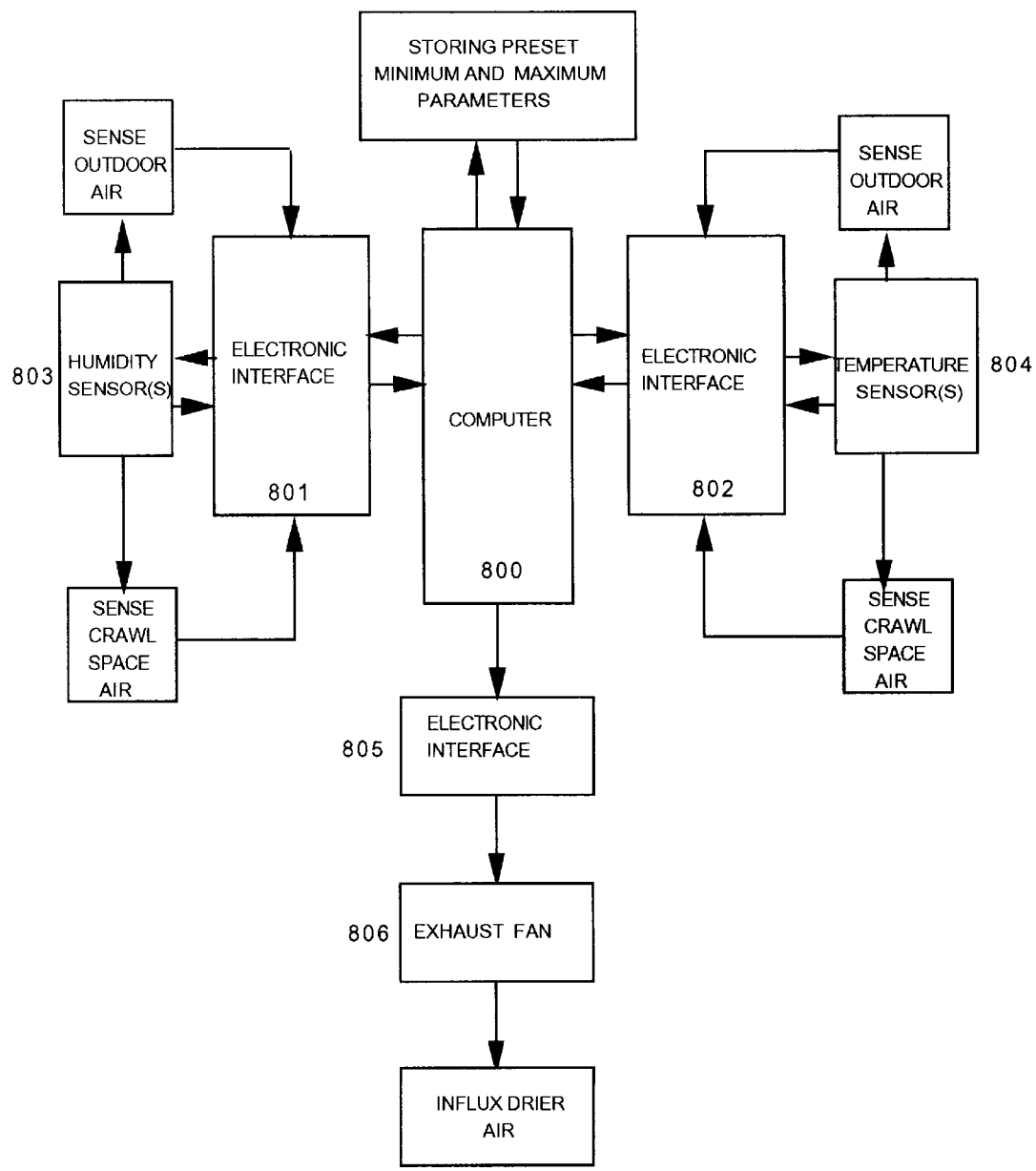

FIG. 8 depicts a schematic of the relationship of the basic components of the versions of the invention, as said components are described in the specification herein.

Figure 9:
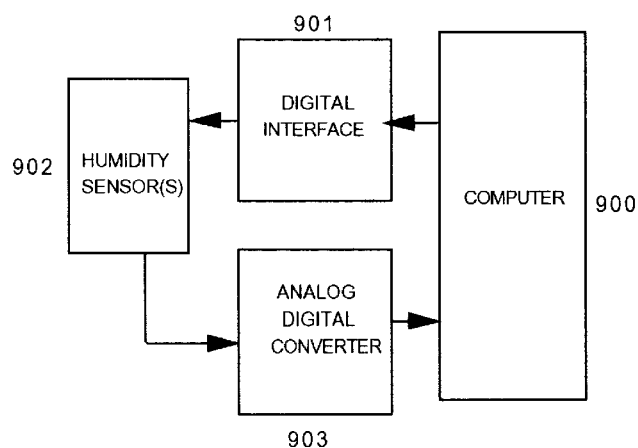

FIG. 9 depicts a schematic of the relationship between the basic components of one version of one aspect of the invention, using digital technology for humidity sensing.

Figure 10:
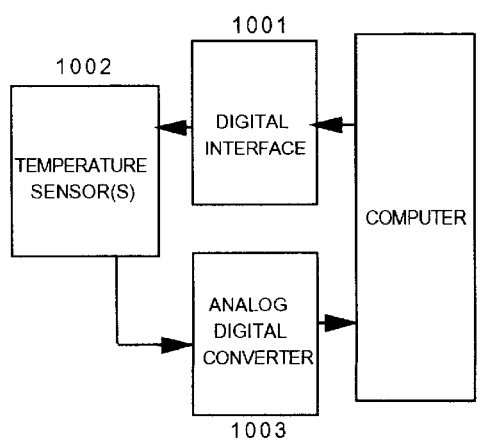

FIG. 10 depicts a schematic of the relationship between the basic components of one version of one aspect of the invention, using digital technology for temperature sensing.

Figure 11:
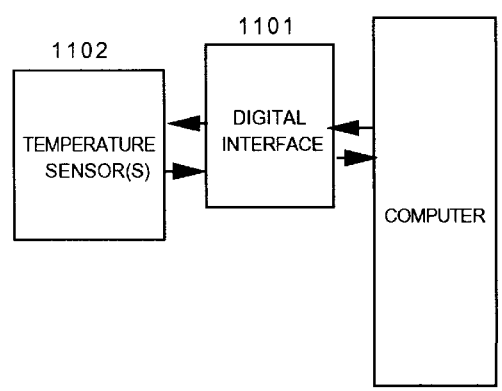

FIG. 11 depicts a schematic of the relationship between the basic components of another version of one aspect of the invention, using digital technology for temperature sensing.

Figure 12:
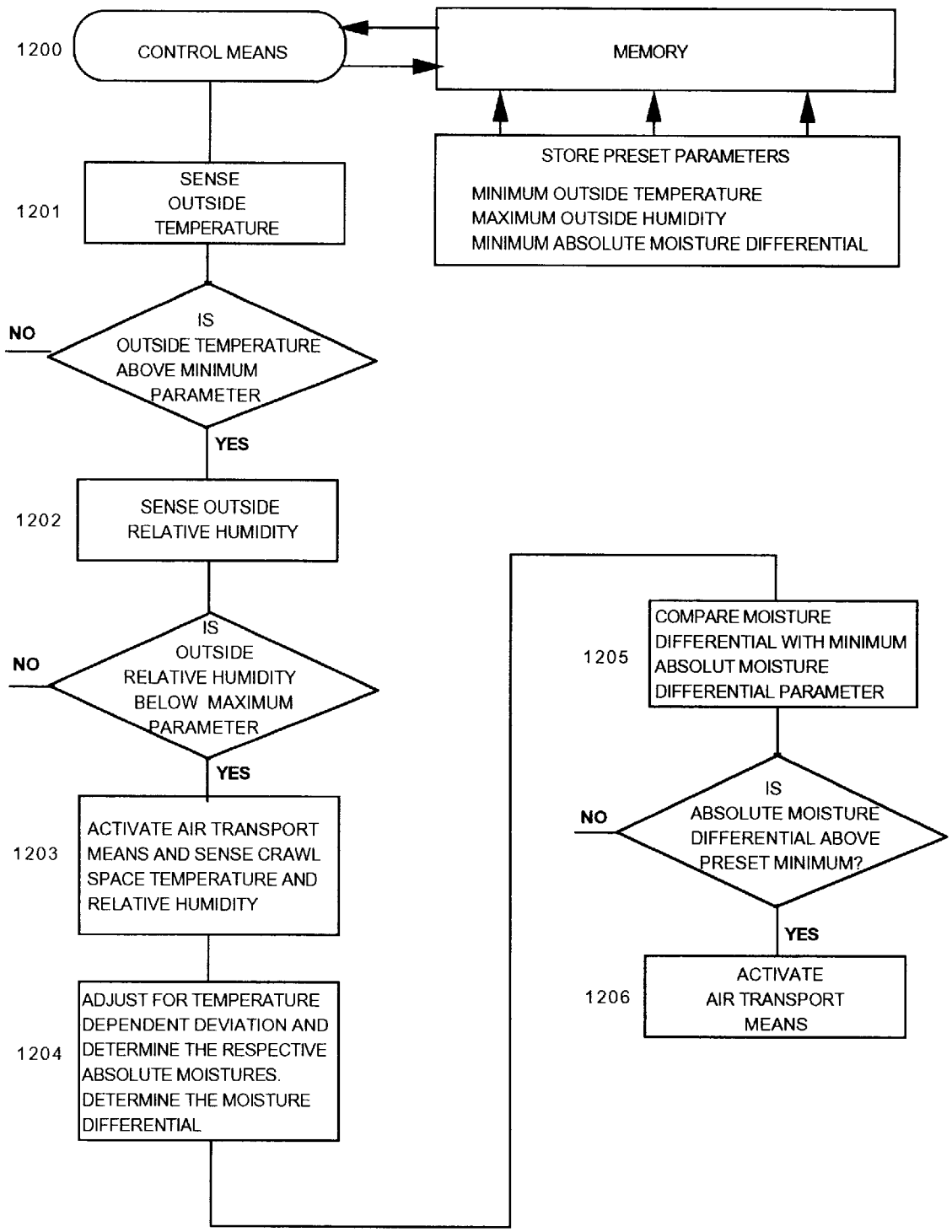

FIG. 12 depicts the operational steps of the invention forming the basis of claim 6.

Figure 13:
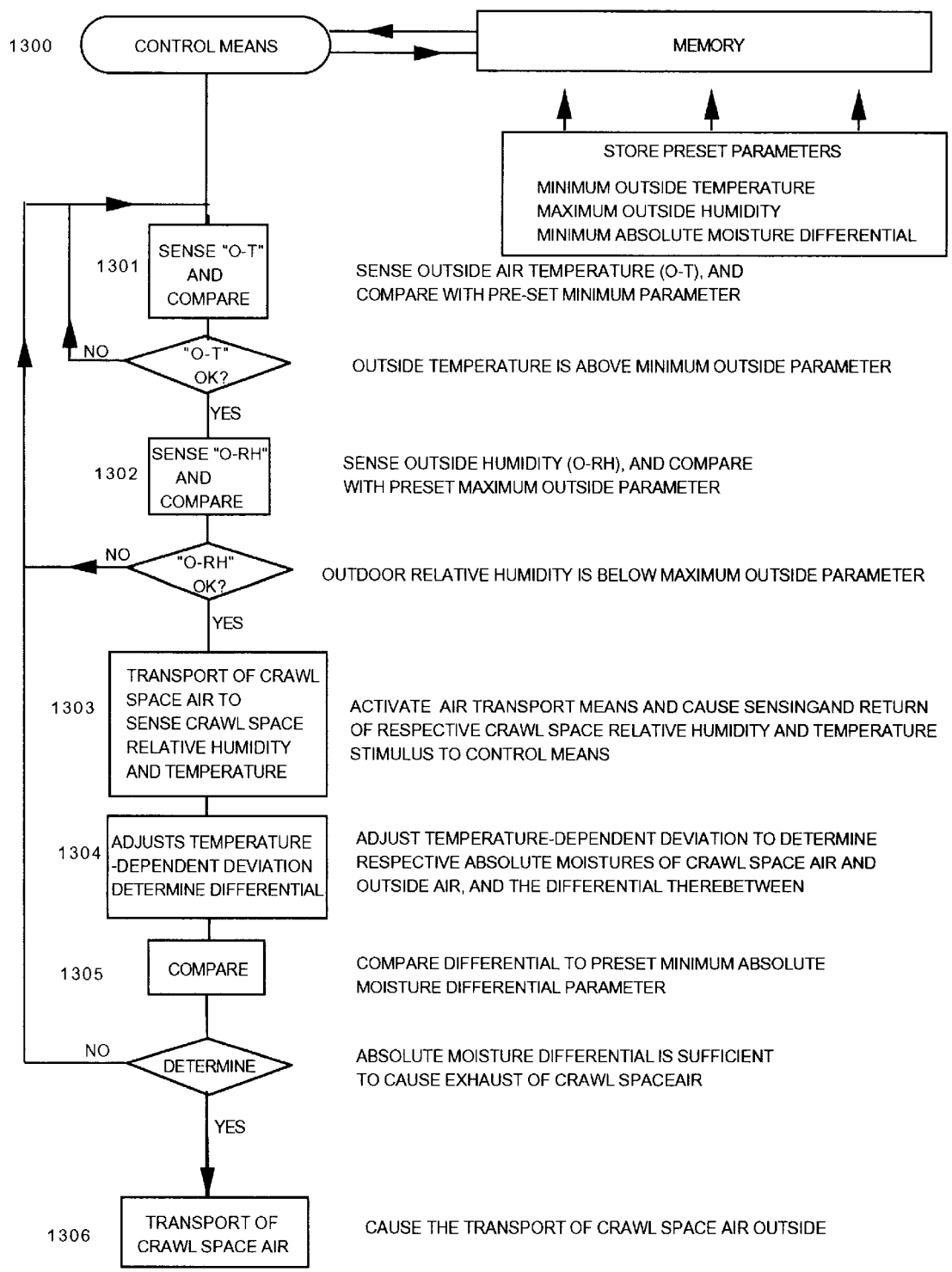

FIG. 13 depicts the operational steps of the invention forming the basis of claims 23 and 24.

Figure 14:
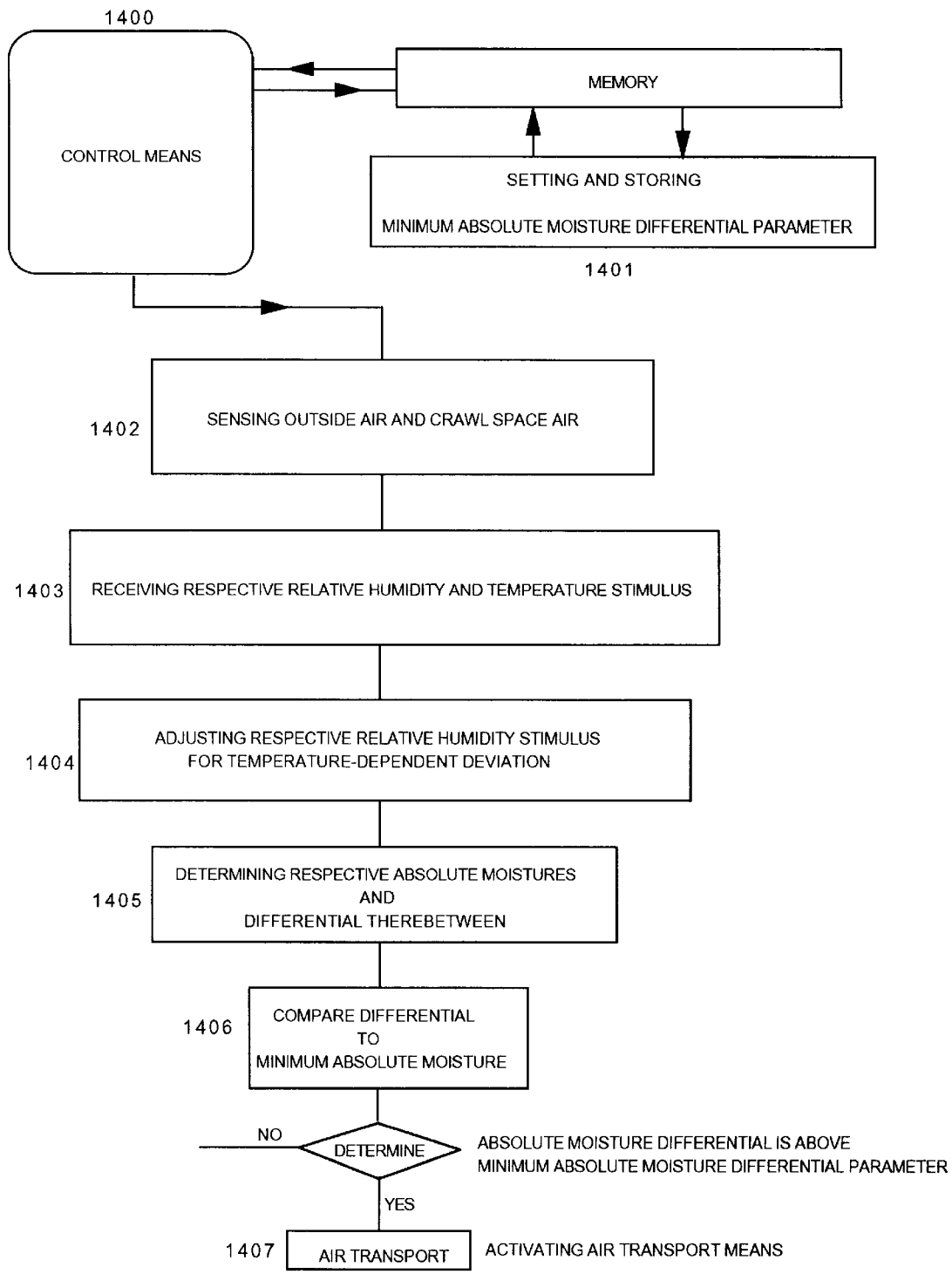

FIG. 14 depicts the operational steps of the invention forming the basis of claim 25.

Figure 15:
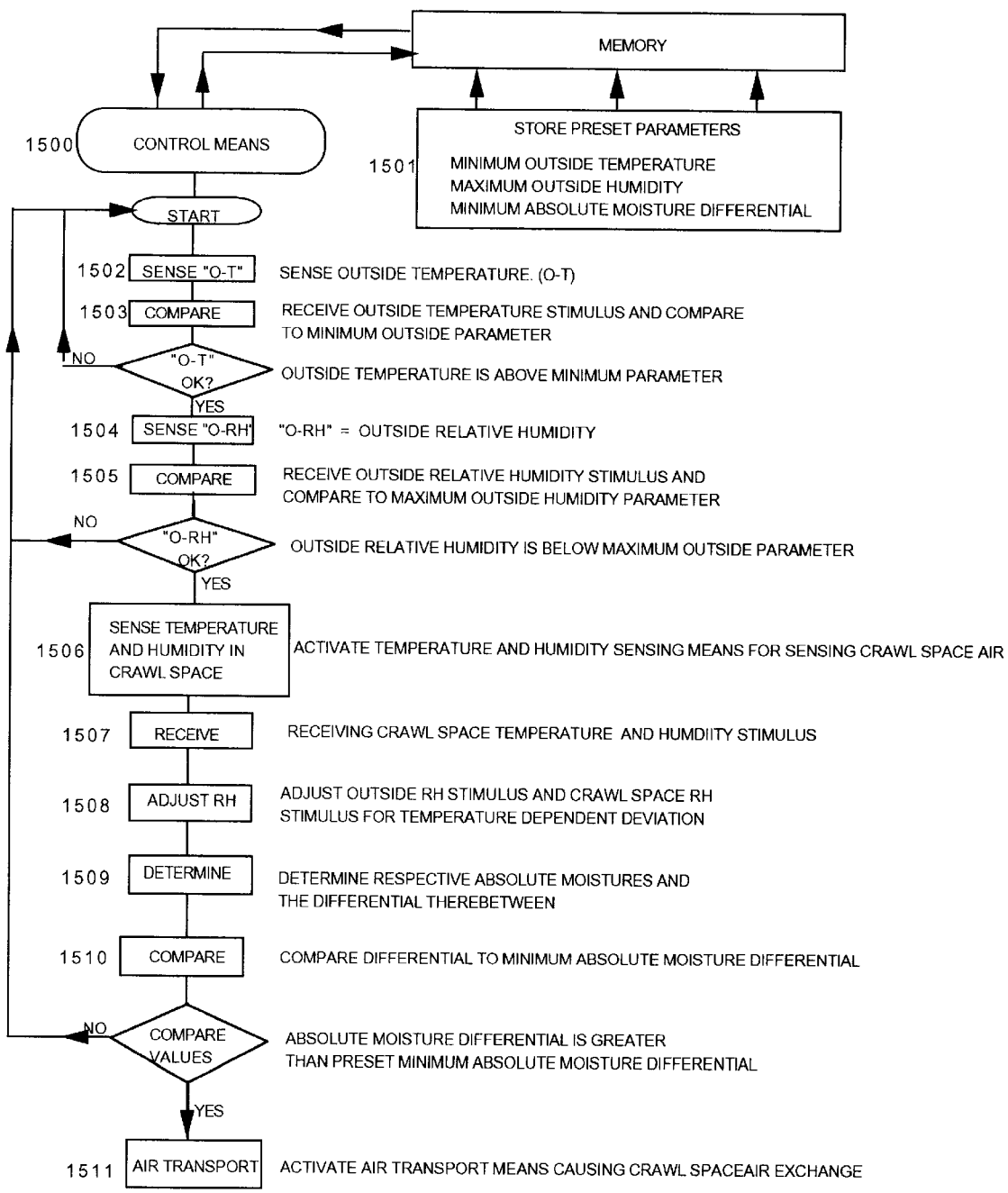

FIG. 15 depicts the operational steps of the invention forming the basis of claim 26.

DETAILED DESCRIPTION OF THE INVENTION

For the sake of simplicity and to give the claims of this patent application the broadest interpretation and construction possible, the following definitions will apply:

(a) "absolute moisture" means the amount of water vapor in a sample of air.

(b) "relative humidity" means the ratio of the absolute moisture to the amount of moisture in an identical sample of saturated vapor at the prevailing dry-bulb temperature.

(c) "minimum absolute moisture differential" means the lowest absolute moisture differential between crawl space air and outside air allowing for activation of ventilation, said parameter determining the point at which the absolute moisture of crawl space air is significantly higher than the absolute moisture of outside air, for ventilation activation purposes.

(d) "crawl space" means an area fully or partially confined beneath a structure, including (without limitation) a cellar, basement, or crawl space enclosed by the sub-flooring and the lowermost or foundation walls of a structure.

(e) "crawl space air" or "inside air" means air found within the full or partial confines of a crawl space.

(f) "outside air" means air surrounding or adjacent to ventilator sensing means, situated exterior to a ventilator fan and immediately obtained from exterior to the structure, but not necessarily physically exterior to a structure wall.

(g) "exterior" means situated toward the outside of the structure relative to another reference point, but not necessarily physically outside the structure.

(h) "minimum outside temperature" means the lowest temperature reading for outside air allowing for the activation of sampling of outside humidity, said parameter determining the point at which the outside temperature is too cold for said sampling.

(i) "maximum outside humidity" means the highest relative humidity reading for outside air allowing for the activation of sampling of crawl space air humidity, said parameter determining the point at which the outside humidity is too high for said sampling.

Also for the sake of simplicity, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

The amount of water vapor that may be contained in air, without reaching total saturation and condensation, is dependent upon the temperature of the air. Warmer air is capable of holding more moisture than is cold air. When warm, moisture-laden air cools enough, the air becomes more saturated with water vapor, creating high moisture conditions resulting in decay of structural supports and increased concentrations of microorganisms and other pests; if the crawl space air becomes fully saturated, condensation and precipitation of the water from the air will occur.

Relative humidity is essentially a percentage measurement wherein the numerator is the actual amount of moisture in the air and the denominator is the maximum amount of moisture that the air is capable of retaining at its particular temperature. As an example, assume 1 pound of dry air at 80° F. That air is capable of holding about 0.022 pound of water vapor at saturation. If it actually holds 0.011 pound of water, its relative humidity is 50%. By contrast, the same amount of air at 65° F. is capable of holding only about 0.013 pound of water at saturation.

In the context of crawl space ventilating systems, where the most important goal is to reduce moisture, the threshold decision is whether to exchange outside air for crawl space air. The answer to this critical question is primarily dependent upon whether the outside air contains more or less absolute moisture than the crawl space air. The present invention focuses upon such an absolute moisture differential, whereas preexisting ventilators having moisture-related features focus primarily upon the relative humidity of crawl space air, rather than absolute moisture or absolute moisture differential.

Figure 2:
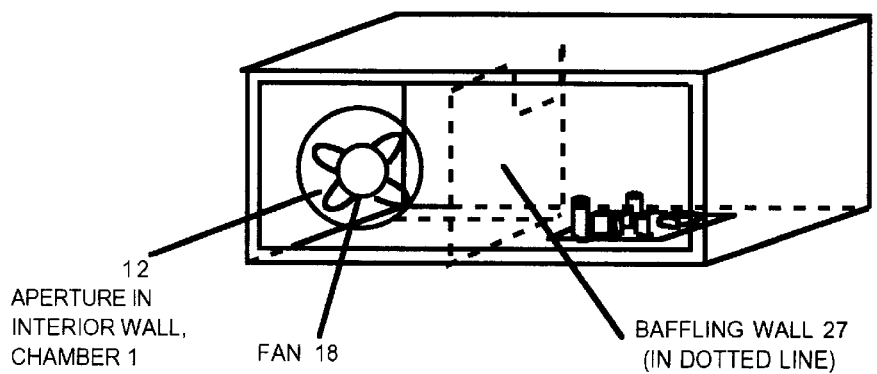
FIG. 2 depicts a perspective view of another version of the invention, having a single set of temperature and humidity sensors.

In general, the present invention involves an apparatus for ventilating the crawl space of a structure. This version generally comprises at least one electrically powered means for causing the transport of crawl space air (for example, fan 18 of FIG. 1 or FIG. 2), said air transport means adapted to at least partially occlude an aperture in a foundation wall of the structure and oriented to, upon receiving an appropriate stumulus, cause the transport of crawl space air through said aperture to outside the structure. It also includes at least one humidity sensing means for determining the relative humidity of crawl space air and of outside air, respectively (for example, 14 of FIG. 1), and for transmitting respective stimulus dependent thereon (the "RH stimulus"); and at least one temperature sensing means for sensing the respective temperature of crawl space air and of outside air (for example, 13 of FIG. 1), and for transmitting respective stimulus dependent thereon.

This version additionally includes at least one control means (for example, 15 of FIG. 1), including means for setting and storing at least one pre-set minimum absolute moisture differential parameter for ventilation activation (1401 of FIG. 14), said control means functionally connected to said humidity sensing means (1402) for controlling the activation thereof and receiving RH stimulus therefrom (1403), said control means also functionally connected to said temperature sensing means (1402) for controlling the activation thereof and receiving temperature stimulus therefrom (1403); said control means also for adjusting said respective RH stimulus for any known temperature-dependent deviation (1404) and determining therefrom the respective absolute moisture of the crawl space air and of the outside air, and for determining the absolute moisture differential between said respective absolute moistures (1405) and comparing said differential to said minimum absolute moisture differential parameter for ventilation activation (1406). Said control means are also functionally connected to said air transport means for controlling the activation thereof (1407). As will be further specified hereinbelow, the control means may be comprised of a computer with appropriate hardware components, software programming and functional connections to accomplish or control the sensing of air temperature and humidity, convert such sensory stimulus into stimulus that will be meaningful to the computer (such as conversion from analog to digital readings), make whatever adjustment needed to compensate for known deviations (such as adjusting for deviations known to occur when some electronic sensing devices are used), compare such stimulus to pre-set operating parameters, and control the activation of ventilation such as powered fans or opening of louvers. These may sometimes be referred to simply as control functions.

In one invented method, generally depicted in FIG. 6, said control means causes said humidity sensing means and temperature sensing means to sense the respective relative humidities and temperatures of crawl space air and of outside air and to transmit to said control means respective RH stimulus and respective temperature stimulus dependent thereon. (601 in FIG. 6) Said control means also adjusts said respective RH stimulus for any known temperature-dependent deviation and, for each said respective adjusted stimulus, determines the respective absolute moisture of the crawl space air and of the outside air. (602) Said control means determines the absolute moisture differential between said respective absolute moistures and compares said differential to said minimum absolute moisture differential parameter. (603) If said absolute moisture differential is greater than said minimum absolute moisture differential parameter, said control means activates said air transport means to cause the transport of crawl space air outside, causing the influx of drier outside air into the crawl space thereby lowering the humidity therein. (604) (The apparatus may be adapted to enter a holding cycle, essentially staying dormant until again activated to re-start the sensing of air conditions, if said absolute moisture differential is equal to or less than said minimum absolute moisture differential parameter. Alternatively, said apparatus may be adapted to sense continuously until said absolute moisture differential exceeds said minimum absolute moisture differential parameter.)

In one preferred embodiment of the invention, said control means is a computer having software programming and functional connections for accomplishing all the setting, storing and controlling functions set forth herein.

As generally illustrated in FIG. 8, said humidity sensing means may also comprise at least one electronic relative humidity sensor 803 functionally connected by electronic interface 801 with said computer 800, through which interface said computer causes said humidity sensor to sense the respective relative humidity of crawl space air and of outside air, and to transmit to said computer respective electronic RH stimulus dependent thereon; one preferred embodiment includes at least one analog relative humidity sensor (903 of FIG. 9) functionally connected to said computer by digital interface (901). Also as depicted in FIG. 8, said temperature sensing means may also comprise at least one electronic temperature sensor 804 functionally connected by electronic 802 interface with said 800 computer, through which interface said computer causes said temperature sensor to sense the respective temperature of crawl space air and of outside air, and to transmit to said computer respective electronic temperature stimulus dependent thereon; one preferred embodiment includes at least one of said temperature sensors functionally connected to said computer by digital interface. (1001 of FIG. 10 or 1101 of FIG. 11.) Said air transport means may also comprise at least one electric-powered exhaust fan 806 functionally connected by electronic connection 805 to said computer, through which functional connection said computer activates said fan if said absolute moisture differential exceeds said minimum absolute moisture differential parameter.

Besides the aforementioned elements, the invention disclosed herein may further comprise control means for setting and storing at least one pre-set minimum outside temperature parameter and at least one pre-set maximum outside humidity parameter. (See FIGS. 12, 13 or 15.) The apparatus may be adapted to enter a holding cycle, essentially staying dormant until activated to again re-start the sensing of air conditions, if outside temperature stimulus is equal to or less than said minimum outside temperature parameter, or if outside temperature stimulus is equal to or above said maximum outside humidity parameter. Alternatively, said apparatus may be adapted to sense continuously until said respective stimulus satisfies said parameters.

In this embodiment, said control means causes said temperature sensing means to sense the outside air temperature and return corresponding temperature stimulus to said control means for comparison with said pre-set minimum outside temperature parameter (1201). If said temperature stimulus is above said minimum outside temperature parameter, said control means causes said humidity sensing means to sense the relative humidity of outside air and return a corresponding outside RH stimulus to said control means for comparison with said pre-set maximum outside humidity parameter (1202). If said outside RH stimulus is below said maximum outside humidity parameter, said control means causes said air transport means to briefly cause the transport of crawl space air outside of the structure, past said humidity sensing means and said temperature sensing means a sufficient duration to allow the sensing of the relative humidity and temperature of the crawl space air and return corresponding inside RH stimulus and temperature stimulus to said control means (1203). Said control means adjusts said respective RH stimulus for temperature-dependent deviation and determines the respective absolute moistures of crawl space air and outside air and the differential therebetween (1204). Said control means also compares said differential with said minimum absolute moisture differential parameter (1205). If said differential is greater than said minimum absolute moisture differential parameter, said control means causes said air transport means to cause the transport of crawl space air outside (1206).

Another version of the invention may be further comprised of a housing (for example, 10 of FIG. 1) adapted to be mounted on the foundation wall of the crawl space structure and at least substantially occluding said aperture in the foundation wall. Although said housing may be configured in the general shape of a box, it may assume any shape so long as it fulfills the structural and functional features such as, for example, facilitating mounting of the apparatus on or in a foundation or crawl space wall, protecting the elements (sensors, computer and fan) from rain, and providing a location for anchoring said elements in any desired configuration. Said housing typically includes an interior wall adjacent to the crawl space, a corresponding opposite exterior wall adjacent to the outside, a left side wall and a corresponding opposite right side wall, each side wall connecting said interior and exterior walls; it may also have a floor and a ceiling, completing the enclosure.

Said interior wall should have an aperture allowing the flow of crawl space air into said housing, said air transport means should be mounted on said interior wall and at least substantially occluding said aperture to govern the passage of crawl space air therethrough. Ideally the air transport means is an exhaust fan with blades oriented to, upon the appropriate stimulation, transport crawl space air through the housing, and to the outside through the exterior wall; said exterior wall should also have at least one aperture in said exterior wall to allow exhaustion of crawl space air therethrough.

In one version, said housing encompasses said temperature sensing means, humidity sensing means and control means, said humidity sensing means and temperature sensing means situated exterior to said air transport means; the crawl space air travels past at least one temperature sensor and humidity sensor enroute to the outside. Said housing may also be adapted to fully and snugly occlude said aperture in the foundation wall of the crawl space structure.

One preferred embodiment comprises an apparatus as described immediately above, wherein said housing 10 further includes at least one baffling wall 10 separating said housing into chambers 1 and 2. (See, (for example) 17 of FIG. 1 or 27 of FIG. 2.) Said baffling wall (17 or 27) defines at least one orifice 16 allowing air to traverse between said chamber 1 and chamber 2 when said air transport means 18 is active. Said air transport means mounted occlusively over said interior wall aperture 12 is situated in said chamber 1. Also, at least one of said exterior wall apertures 19 is situated in said chamber 1. Said control means 15 is housed in said chamber 2, and said humidity sensing means 14 and said temperature sensing means 13 are housed in said chamber 2 near said exterior wall and at least one of said apertures therein. One preferred embodiment includes a computer with software programming as said control means, at least one analog relative humidity sensor functionally connected to said computer by digital interface, at least one electronic temperature sensing means functionally connected to said computer by digital interface, and at least one electric-powered exhaust fan functionally connected to said computer.

Figure 3:
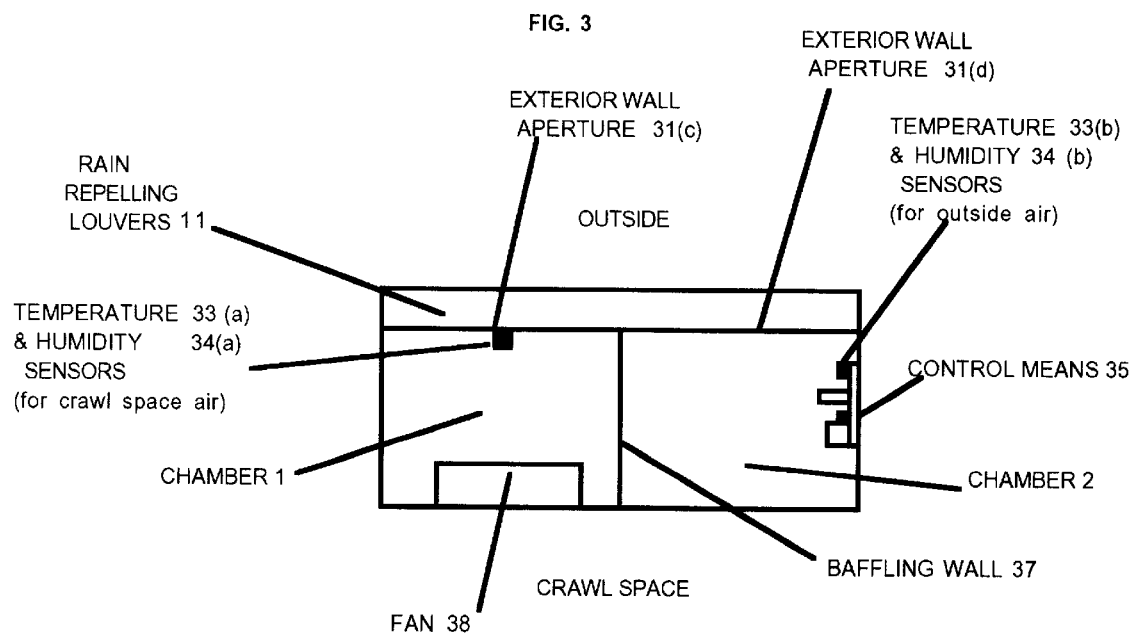
FIG. 3 depicts a schematic diagram of another embodiment having dual sets of temperature and humidity sensors.
Figure 4:
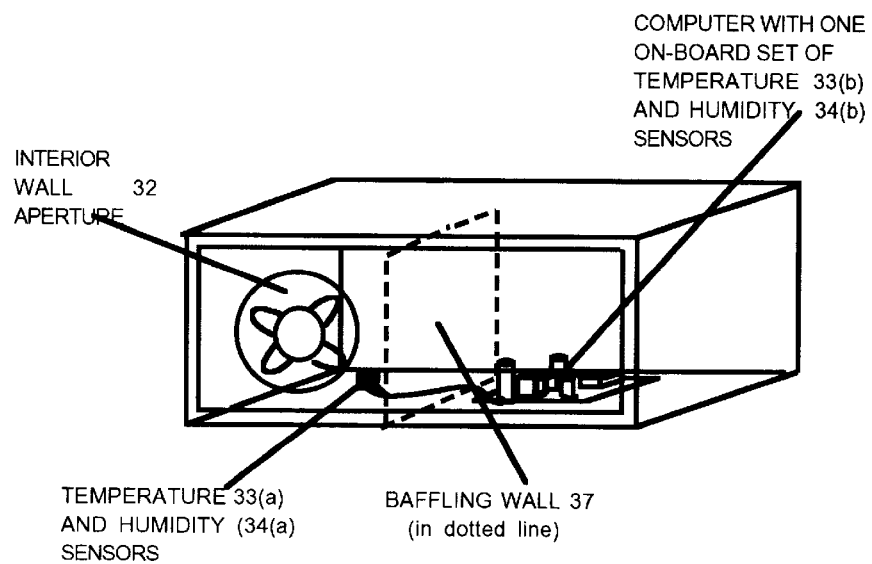
FIG. 4 depicts a perspective view of another version of the invention, having dual sets of temperature and humidity sensors.

Another preferred embodiment utilizes separate sensors in separated chambers, to further isolate the sensing of outside air from the sensing of crawl space air. (See FIG. 3 or FIG. 4.) This version comprises an apparatus described immediately hereinabove, but with said housing including a baffling wall 37 separating said housing into pneumatically distinct chambers 1 and 2. Said air transport means (for example, 38 in FIG. 3) mounted occlusively over said interior wall aperture 32 is situated in said chamber 1, as is at least one of said exterior wall apertures 31(*c*), one of said humidity sensing means 34(*a*) and one of said temperature sensing means 33(*a*). Said control means 35 is situated in said chamber 2, as is at least one of said exterior wall apertures 31(*d*), whereas one of said humidity sensing means 34(b) and one of said temperature sensing means 33(b) are housed in said chamber 2 near said exterior wall and said aperture.

One preferred embodiment includes a computer with software programming as said control means, at least one analog relative humidity sensor functionally connected to said computer by digital interface, at least one electronic temperature sensing means functionally connected to said computer by digital interface, and at least one electric-powered exhaust fan functionally connected to said computer.

All of the embodiments disclosed herein may optionally further include a grill adapted to fully and snugly occlude the foundation wall aperture at the exterior surface of the foundation wall, said grill mounted to the corresponding perimeter of said housing exterior wall. Said grill may have openings small enough to prevent insects from entering the crawl space, and may even have openings small enough to hinder the entry of rain. In another version, said grill is comprised of a plurality of parallel, essentially horizontally oriented louvers (11 in FIG. 3), each having a longitudinal axis; these louvered grills may include those that may be known in the field, such as those described in the '049 patent and the '804 patent cited hereinabove. Each of said louvers may cooperatively swivel around said longitudinal axis from a closed to an open position. The invention disclosed herein may further include a functional connection between said louvers and said control means, wherein said louvers are initially positioned in said closed position and the activation of said air transport means (described herein) likewise causes said louvers to swivel to said open position. Said functional connection may be known in the field, such as those described in the '049 patent and the '804 patent cited hereinabove. The improvement of the present invention lies primarily in the activation thereof dependent upon said absolute moisture differential.

One specific preferred embodiment is an apparatus for ventilating the crawl space of a structure, comprising:

a rectangulo-cuboidal housing having an interior wall (21 in FIG. 1) adjacent to the crawl space and about 15 inches wide by 8 inches tall, a corresponding opposite exterior wall adjacent to the outside and about 15 inches wide by 8 inches tall, a left side wall and a corresponding opposite right side wall, each about 8 inches wide and 8 inches tall and connecting said interior and exterior walls, at least one baffling wall (17 in FIG. 1 or 27 in FIG. 2) between said interior and exterior walls between said left and right side walls, separating said housing into chambers 1 and 2;

said chamber 1 having an aperture in said interior wall, an electric exhaust fan mounted on said interior wall and occluding said aperture to govern the passage of crawl space air therethrough, said chamber 1 also having at least one aperture in said exterior wall to allow exhaustion of crawl space air therethrough;

said chamber 2 having at least one aperture in said exterior wall and housing an electronic temperature sensor with digital interface and an analog relative humidity sensor with digital interface near said aperture, said chamber 2 also housing a computer having software programming and functional connections for setting and storing at least one pre-set minimum outside temperature parameter, at least one pre-set maximum outside humidity parameter, and at least one minimum absolute moisture differential parameter, and for:

(1) causing said temperature sensing means to sense the outside air temperature and return corresponding temperature stimulus to said control means for comparison with said minimum outside temperature parameter;

(2) causing said humidity sensing means to determine the relative humidity of outside air and return a corresponding outside RH stimulus to said computer for comparison with said maximum outside humidity parameter;

(3) causing said air transport means to briefly cause the transport of crawl space air outside of the structure, past said humidity sensing means and said temperature sensing means a sufficient duration to allow the sensing of the relative humidity and temperature of the crawl space air and return corresponding inside RH stimulus and temperature stimulus to said control means;

(4) adjusting said respective RH stimulus for temperature-dependent deviation and determining the respective absolute moistures of crawl space air and outside air and the differential therebetween;

(5) comparing said differential with said minimum absolute moisture differential parameter; and (6) causing said air transport means to cause the transport of crawl space air outside; wherein, as generally illustrated in FIG. 13, (a) said control means causes said temperature sensing means to sense the outside air temperature and return corresponding temperature stimulus to said control means for comparison with said pre-set minimum outside temperature parameter (1301); whereupon (b) if said temperature stimulus is above said minimum outside temperature parameter, said control means causes said humidity sensing means to sense the relative humidity of outside air and return a corresponding outside RH stimulus to said control means for comparison with said pre-set maximum outside humidity parameter (1302); whereupon (c) if said outside RH stimulus is below said maximum outside humidity parameter, said control means causes said air transport means to briefly cause the transport of crawl space air outside of the structure, past said humidity sensing means and said temperature sensing means a sufficient duration to allow the sensing of the relative humidity and temperature of the crawl space air and return corresponding inside RH stimulus and temperature stimulus to said control means (1303), whereupon (d) said control means adjusts said respective RH stimulus for temperature-dependent deviation and determines the respective absolute moistures of crawl space air and outside air and the differential therebetween (1304); whereupon (e) said control means compares said differential with said minimum absolute moisture differential parameter (1305); whereupon (f) if said differential is greater than said minimum absolute moisture differential parameter, said control means causes said air transport means to cause the transport of crawl space air outside (1306).

Another specific preferred embodiment utilizes separate sensors in separated chambers, to further isolate the sensing of outside air from the sensing of crawl space air. This version comprises an apparatus described immediately hereinabove, but with said housing including a baffling wall separating said housing into pneumatically distinct chambers 1 and 2. This version accordingly comprises:

a rectangulo-cuboidal housing having an interior wall adjacent to the crawl space and about 15 inches wide by 8 inches tall, a corresponding opposite exterior wall adjacent to the outside and about 15 inches wide by 8 inches tall, a left side wall and a corresponding opposite right side wall, each about 8 inches wide and 8 inches tall and connecting said interior and exterior walls, a baffling wall extending between said interior and exterior walls between said left and right side walls, separating said housing into pneumatically distinct chambers 1 and 2, said chamber 1 having an aperture in said interior wall, an electric exhaust fan mounted on said interior wall and occluding said aperture to govern the passage of crawl space air therethrough, said chamber 1 also having at least one aperture in said exterior wall to allow exhaustion of crawl space air therethrough, said chamber 1 additionally having, between said fan and exterior wall aperture, a first electronic temperature sensor with digital interface and a first analog relative humidity sensor with digital interface;

said chamber 2 having at least one aperture in said exterior wall and housing a second electronic temperature sensor with digital interface and a second analog relative humidity sensor with digital interface near said aperture, said chamber 2 also housing a computer having software programming and functional connections for setting and storing at least one pre-set minimum outside temperature parameter, at least one pre-set maximum outside humidity parameter, and at least one minimum absolute moisture differential parameter, and for accomplishing the other control functions and steps set forth in the description of the immediately preceding embodiment.

It should be understood that the invention disclosed herein is generally not limited by construction materials for any particular element thereof, to the extent that such materials satisfy the structural or functional requirements for the respective element. For example, any materials may be used to make a housing, so long as the materials fulfill the requirements that said element be sufficiently rigid to comprise a housing that protects interior elements from precipitation and facilitates the proper positioning of the interior elements relative to the structure and the environments outside and inside the structure.

Although the precise dimensions of the inventor's preferred embodiments are not critical so long as the structural and functional requirements of the respective elements are satisfied, said housing may be comprised of metal, plastic or similar structural materials. Some embodiments are about 8 inches tall, about 15 inches wide, and about 8 inches deep, relative to the structure wall. Such dimensions correspond to the size of a standard cinder block used in construction of many foundation and crawl space walls.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. An apparatus for ventilating the crawl space of a structure, comprising:

at least one electrically powered means for causing the transport of crawl space air, said air transport means adapted to at least partially occlude an aperture in a foundation wall of the structure and oriented to, upon receiving an appropriate stumulus, cause the transport of crawl space air through said aperture to outside the structure;

at least one humidity sensing means for determining the relative humidity of crawl space air and of outside air, respectively, and for transmitting respective stimulus dependent thereon (the "RH stimulus");

at least one temperature sensing means for sensing the respective temperature of crawl space air and of outside air, and for transmitting respective stimulus dependent thereon;

at least one control means including means for setting and storing at least one pre-set minimum absolute moisture differential parameter for ventilation activation, said control means functionally connected to said humidity sensing means for controlling the activation thereof and receiving RH stimulus therefrom, said control means also functionally connected to said temperature sensing means for controlling the activation thereof and receiving temperature stimulus therefrom, said control means also for adjusting said respective RH stimulus for temperature-dependent deviation and determining therefrom the respective absolute moisture of the crawl space air and of the outside air, said control means also for determining the absolute moisture differential between said respective absolute moistures and comparing said differential to said minimum absolute moisture differential parameter for ventilation activation, said control means also functionally connected to said air transport means for controlling the activation thereof, wherein (a) said control means causes said humidity sensing means and temperature sensing means to sense the respective relative humidities and temperatures of crawl space air and of outside air and to transmit to said control means respective RH stimulus and respective temperature stimulus dependent thereon; whereupon (b) said control means adjusts said respective RH stimulus for temperature-dependent deviation and, for each of said respective adjusted stimulus, determines the respective absolute moisture of the crawl space air and of the outside air; whereupon (c) said control means determines the absolute moisture differential between said respective absolute moistures and compares said differential to said minimum absolute moisture differential parameter; whereupon (d) if said absolute moisture differential is greater than said minimum absolute moisture differential parameter, said control means activates said air transport means to cause the transport of crawl space air outside, causing the influx of drier outside air into the crawl space thereby lowering the humidity therein.

2. An apparatus described in claim 1, wherein said control means is a computer having software programming and functional connections for said setting, storing and control means functions.

3. An apparatus described in claim 2, wherein:

said humidity sensing means comprises at least one electronic relative humidity sensor functionally connected by electronic interface with said computer, through which interface said computer causes said humidity sensor to sense the respective relative humidity of crawl space air and of outside air, and to transmit to said computer respective electronic RH stimulus dependent thereon;

said temperature sensing means comprises at least one electronic temperature sensor functionally connected by electronic interface with said computer, through which interface said computer causes said temperature sensor to sense the respective temperature of crawl space air and of outside air, and to transmit to said computer respective electronic temperature stimulus dependent thereon; and said air transport means comprises at least one electric-powered exhaust fan functionally connected by electronic connection to said computer, through which functional connection said computer activates said fan if said absolute moisture differential exceeds said minimum absolute moisture differential parameter.

4. An apparatus described in claim 3, wherein said humidity sensor comprises at least one analog relative humidity sensor functionally connected to said computer by digital interface.

5. An apparatus described in claim 3, wherein said temperature sensor is functionally connected to said computer by digital interface.

6. An apparatus described in claim 1, wherein said control means further includes means for setting and storing at least one pre-set minimum outside temperature parameter and at least one pre-set maximum outside humidity parameter; wherein (a) said control means causes said temperature sensing means to sense the outside air temperature and return corresponding temperature stimulus to said control means for comparison with said pre-set minimum outside temperature parameter; whereupon (b) if said temperature stimulus is above said minimum outside temperature parameter, said control means causes said humidity sensing means to sense the relative humidity of outside air and return a corresponding outside RH stimulus to said control means for comparison with said pre-set maximum outside humidity parameter; whereupon (c) if said outside RH stimulus is below said maximum outside humidity parameter, said control means causes said air transport means to briefly cause the transport of crawl space air outside of the structure, past said humidity sensing means and said temperature sensing means a sufficient duration to allow the sensing of the relative humidity and temperature of the crawl space air and return corresponding inside RH stimulus and temperature stimulus to said control means; whereupon (d) said control means adjusts said respective RH stimulus for temperature-dependent deviation and determines the respective absolute moistures of crawl space air and outside air and the differential therebetween; whereupon (e) said control means compares said differential with said minimum absolute moisture differential parameter; whereupon (f) if said differential is greater than said minimum absolute moisture differential parameter, said control means causes said air transport means to cause the transport of crawl space air outside.

7. An apparatus described in claim 6, wherein said control means is a computer having software programming and functional connections for said setting, storing and control means functions.

8. An apparatus described in claim 7, wherein:

said humidity sensing means comprises at least one electronic relative humidity sensor functionally connected by electronic interface with said computer, through which interface said computer causes said humidity sensor to sense the respective relative humidity of crawl space air and of outside air, and to transmit to said computer respective electronic RH stimulus dependent thereon;

said temperature sensing means is at least one electronic temperature sensor functionally connected by electronic interface with said computer, through which interface said computer causes said temperature sensor to sense the respective temperature of crawl space air and of outside air, and to transmit to said computer respective electronic temperature stimulus dependent thereon; and said air transport means is at least one electric-powered exhaust fan functionally connected by electronic connection to said computer, through which functional connection said computer activates said fan if said absolute moisture differential exceeds said minimum absolute moisture differential parameter.

9. An apparatus described in claim 8, wherein said humidity sensor is at least one analog relative humidity sensor functionally connected to said computer by digital interface.

10. An apparatus described in claim 8, wherein said temperature sensor is functionally connected to said computer by digital interface.

11. An apparatus described in claim 6, wherein:

said minimum outside temperature parameter is in the range of between about 32° F. and about 50° F.;

said maximum outside humidity parameter is in the range of between about 60% and about 90%; and said minimum absolute moisture differential parameter is in the range of between about 5% and about 25%.

12. An apparatus described in claim 6, wherein said minimum outside temperature parameter is about 43° F., said maximum outside humidity parameter is about 85%, and said minimum absolute moisture differential parameter is about 10%.

13. An apparatus described in claim 6, further comprising a housing adapted to be mounted on the foundation wall of the crawl space structure and at least substantially occluding said aperture in the foundation wall, said housing having an interior wall adjacent to the crawl space, a corresponding opposite exterior wall adjacent to the outside, a left side wall and a corresponding opposite right side wall, each connecting said interior and exterior walls, said interior wall having an aperture, said air transport means mounted on said interior wall and at least substantially occluding said aperture to govern the passage of crawl space air therethrough, said exterior wall also having at least one aperture in said exterior wall to allow exhaustion of crawl space air therethrough.

14. An apparatus described in claim 13, wherein said housing further encompasses said temperature sensing means, humidity sensing means and control means, said humidity sensing means and temperature sensing means are situated exterior to said air transport means, and said housing is adapted to fully and snugly occlude said aperture in the foundation wall of the crawl space structure.

15. An apparatus described in claim 13, wherein:

said housing further includes at least one baffling wall separating said housing into chambers 1 and 2, said wall defining at least one orifice allowing air to traverse between said chamber 1 and chamber 2 when said air transport means is active;

said air transport means mounted occlusively over said interior wall aperture is situated in said chamber 1, and at least one of said exterior wall aperture is situated in said chamber 1;

said control means is housed in said chamber 2, and said humidity sensing means and said temperature sensing means are housed in said chamber 2 near said exterior wall and at least one of said apertures therein.

16. An apparatus described in claim 15, wherein:

said control means is a computer;

said temperature sensing means comprises at least one electronic temperature sensor connected to said computer by digital interface;

said humidity sensing means comprises at least one analog relative humidity sensor connected to said computer by digital interface; and said air transport means comprises at least one electric powered exhaust fan.

17. An apparatus described in claim 13, wherein:

said housing further includes a baffling wall separating said housing into pneumatically distinct chambers 1 and 2;

said air transport means mounted occlusively over said interior wall aperture is situated in said chamber 1, as is at least one of said exterior wall apertures, one of said humidity sensing means and one of said temperature sensing means;

said control means is situated in said chamber 2 as is at least one of said exterior wall apertures, whereas one of said humidity sensing means and one of said temperature sensing means are housed in said chamber 2 near said exterior wall and said aperture.

18. An apparatus described in claim 17, wherein:

said control means is a computer;

said temperature sensing means comprises an electronic thermometer connected to said computer by digital interface; and said humidity sensing means is an analog relative humidity sensor connected to said computer by digital interface.

19. An apparatus described in claim 6, further comprising a grill adapted to fully and snugly occlude said aperture at the exterior surface of the foundation wall, said grill mounted to the corresponding perimeter of said housing.

20. An apparatus described in claim 19, wherein said grill is comprised of a plurality of parallel, essentially horizontally oriented louvers, each having a longitudinal axis.

21. An apparatus described in claim 20, wherein each of said louvers cooperatively swivel around said longitudinal axis from a closed to an open position.

22. An apparatus described in claim 21, further comprising a functional connection between said louvers and said control means, wherein said louvers are initially positioned in said closed position and the activation of said air transport means likewise causes said louvers to swivel to said open position.

23. An apparatus for ventilating the crawl space of a structure, comprising:

a rectangulo-cuboidal housing having an interior wall adjacent to the crawl space and about 15 inches wide by 8 inches tall, a corresponding opposite exterior wall adjacent to the outside and about 15 inches wide by 8 inches tall, a left side wall and a corresponding opposite right side wall, each about 8 inches wide and 8 inches tall and connecting said interior and exterior walls, at least one baffling wall between said interior and exterior walls between said left and right side walls, separating said housing into chambers 1 and 2;

said chamber 1 having an aperture in said interior wall, an electric exhaust fan mounted on said interior wall and occluding said aperture to govern the passage of crawl space air therethrough, said chamber 1 also having at least one aperture in said exterior wall to allow exhaustion of crawl space air therethrough;

said chamber 2 having at least one aperture in said exterior wall and housing an electronic temperature sensor with digital interface and an analog relative humidity sensor with digital interface near said aperture, said chamber 2 also housing a computer having software programming and functional connections for setting and storing at least one pre-set minimum outside temperature parameter, at least one pre-set maximum outside humidity parameter, and at least one minimum absolute moisture differential parameter, and for:

(1) causing said temperature sensing means to sense the outside air temperature and return corresponding temperature stimulus to said control means for comparison with said minimum outside temperature parameter;

(2) causing said humidity sensing means to determine the relative humidity of outside air and return a corresponding outside RH stimulus to said computer for comparison with said maximum outside humidity parameter;

(3) causing said air transport means to briefly cause the transport of crawl space air outside of the structure, past said humidity sensing means and said temperature sensing means a sufficient duration to allow the sensing of the relative humidity and temperature of the crawl space air and return corresponding inside RH stimulus and temperature stimulus to said control means;

(4) adjusting said respective RH stimulus for temperature-dependent deviation and determining the respective absolute moistures of crawl space air and outside air and the differential therebetween;

(5) comparing said differential with said minimum absolute moisture differential parameter; and (6) causing said air transport means to cause the transport of crawl space air outside; wherein (a) said control means causes said temperature sensing means to sense the outside air temperature and return corresponding temperature stimulus to said control means for comparison with said pre-set minimum outside temperature parameter; whereupon (b) if said temperature stimulus is above said minimum outside temperature parameter, said control means causes said humidity sensing means to sense the relative humidity of outside air and return a corresponding outside RH stimulus to said control means for comparison with said pre-set maximum outside humidity parameter; whereupon (c) if said outside RH stimulus is below said maximum outside humidity parameter, said control means causes said air transport means to briefly cause the transport of crawl space air outside of the structure, past said humidity sensing means and said temperature sensing means a sufficient duration to allow the sensing of the relative humidity and temperature of the crawl space air and return corresponding inside RH stimulus and temperature stimulus to said control means; whereupon (d) said control means adjusts said respective RH stimulus for temperature-dependent deviation and determines the respective absolute moistures of crawl space air and outside air and the differential therebetween; whereupon (e) said control means compares said differential with said minimum absolute moisture differential parameter; whereupon (f) if said differential is greater than said minimum absolute moisture differential parameter, said control means causes said air transport means to cause the transport of crawl space air outside.

24. An apparatus for ventilating the crawl space of a structure, comprising:

a rectangulo-cuboidal housing having an interior wall adjacent to the crawl space and about 15 inches wide by 8 inches tall, a corresponding opposite exterior wall adjacent to the outside and about 15 inches wide by 8 inches tall, a left side wall and a corresponding opposite right side wall, each about 8 inches wide and 8 inches tall and connecting said interior and exterior walls, a baffling wall extending between said interior and exterior walls between said left and right side walls, separating said housing into pneumatically distinct chambers 1 and 2;

said chamber 1 having an aperture in said interior wall, an electric exhaust fan mounted on said interior wall and occluding said aperture to govern the passage of crawl space air therethrough, said chamber 1 also having at least one aperture in said exterior wall to allow exhaustion of crawl space air therethrough, said chamber 1 additionally having, between said fan and exterior wall aperture, a first electronic temperature sensor with digital interface and a first analog relative humidity sensor with digital interface;

said chamber 2 having at least one aperture in said exterior wall and housing a second electronic temperature sensor with digital interface and a second analog relative humidity sensor with digital interface near said aperture, said chamber 2 also housing a computer having software programming and functional connections for setting and storing at least one pre-set minimum outside temperature parameter, at least one pre-set maximum outside humidity parameter, and at least one minimum absolute moisture differential parameter, and for:

(1) causing said temperature sensing means to sense the outside air temperature and return corresponding temperature stimulus to said control means for comparison with said minimum outside temperature parameter;

(2) causing said humidity sensing means to determine the relative humidity of outside air and return a corresponding outside RH stimulus to said computer for comparison with said maximum outside humidity parameter;

(3) causing said air transport means to briefly cause the transport of crawl space air outside of the structure, past said humidity sensing means and said temperature sensing means a sufficient duration to allow the sensing of the relative humidity and temperature of the crawl space air and return corresponding inside RH stimulus and temperature stimulus to said control means;

(4) adjusting said respective RH stimulus for temperature-dependent deviation and determining the respective absolute moistures of crawl space air and outside air and the differential therebetween;

(5) comparing said differential with said minimum absolute moisture differential parameter; and (6) causing said air transport means to cause the transport of crawl space air outside; wherein (a) said control means causes said temperature sensing means to sense the outside air temperature and return corresponding temperature stimulus to said control means for comparison with said pre-set minimum outside temperature parameter; whereupon (b) if said temperature stimulus is above said minimum outside temperature parameter, said control means causes said humidity sensing means to sense the relative humidity of outside air and return a corresponding outside RH stimulus to said control means for comparison with said pre-set maximum outside humidity parameter; whereupon (c) if said outside RH stimulus is below said maximum outside humidity parameter, said control means causes said air transport means to briefly cause the transport of crawl space air outside of the structure, past said humidity sensing means and said temperature sensing means a sufficient duration to allow the sensing of the relative humidity and temperature of the crawl space air and return corresponding inside RH stimulus and temperature stimulus to said control means; whereupon (d) said control means adjusts said respective RH stimulus for temperature-dependent deviation and determines the respective absolute moistures of crawl space air and outside air and the differential therebetween; whereupon (e) said control means compares said differential with said minimum absolute moisture differential parameter; whereupon (f) if said differential is greater than said minimum absolute moisture differential parameter, said control means causes said air transport means to cause the transport of crawl space air outside.

25. A method for ventilating the crawl space of a structure, comprising the steps of:

(a) setting and storing at least one minimum absolute moisture differential parameter for ventilation activation, (b) activating at least one humidity sensing means and at least one temperature sensing means for sensing outside air and crawl space air, (c) receiving respective relative humidity stimulus and respective temperature stimulus from said sensing means, (d) adjusting said respective relative humidity stimulus for temperature-dependent deviation, (e) determining therefrom said respective absolute moistures and the differential therebetween, (f) comparing said differential to said minimum absolute moisture differential, and (g) activating at least one air transport means if said absolute moisture differential is above said minimum absolute moisture differential parameter.

26. A method for ventilating the crawl space of a structure, comprising the steps of:

(a) setting and storing at least one minimum outside temperature parameter, maximum outside humidity parameter and minimum absolute moisture differential parameter for ventilation activation, (b) activating at least one temperature sensing means for sensing outside air, (c) receiving outside temperature stimulus therefrom and comparing it to said minimum outside temperature parameter, (d) if said outside temperature is above said minimum outside temperature parameter, activating at least one humidity sensing means for sensing outside air, (e) receiving outside relative humidity stimulus ("RH stimulus") therefrom and comparing it to said maximum outside humidity parameter, (f) if said outside RH stimulus is below said maximum outside humidity parameter, activating at least one temperature sensing means and at least one humidity sensing means for sensing crawl space air, (g) receiving crawl space temperature stimulus and relative humidity stimulus from said sensing means, (h) adjusting said outside RH stimulus and crawl space RH stimulus for temperature dependent deviation, (i) determining therefrom said respective absolute moistures and the differential therebetween, (j) comparing said differential to said minimum absolute moisture differential, and (k) activating at least one air transport means if said absolute moisture differential is above said minimum absolute moisture differential parameter.

* * * * *